United States Patent [19]

Kemp

[11] 4,069,750

[45] Jan. 24, 1978

[54] BREWER WITH TIMER MOUNT

[75] Inventor: Charles L. Kemp, Asheboro, N.C.

[73] Assignee: General Electric Company, Bridgeport, Conn.

[21] Appl. No.: 773,708

[22] Filed: Mar. 2, 1977

[51] Int. Cl.² ..................... A47J 31/44; A47J 31/52
[52] U.S. Cl. ........................................................ 99/280
[58] Field of Search ................. 99/280, 281, 282, 283, 99/279, 285, 288, 295, 306; 29/207.5 R, 207.5 ST, 200 R

[56] References Cited

U.S. PATENT DOCUMENTS

| 3,138,674 | 6/1964 | Boyles | 200/38 FB |
| 3,968,740 | 7/1976 | Brown | 99/289 R |
| 3,981,231 | 9/1976 | Grundy | 99/280 |
| 4,033,248 | 7/1977 | Di Salino | 99/281 |

Primary Examiner—Robert W. Jenkins
Attorney, Agent, or Firm—John F. Cullen; Leonard J. Platt; George R. Powers

[57] ABSTRACT

An electric brewing apparatus for coffee and similar beverages having a heated base supporting a receptacle and a coffee basket therebetween to store, heat, and deliver water to the basket. In this general arrangement an improvement is provided wherein the base comprises a single molded polypropylene box-shaped housing having an access opening only at one end with the other end and side walls being integrally formed from the plastic. A first set of bosses is provided on the other end spaced from one of the side walls and a standard timer that has spaced mounting ears for securing on a flat inner side wall for adjustment through the wall is provided. Second bosses are mounted on the side wall adjacent the open end and all of the bosses are directed towards and molded from the open access end. Wedging structure is provided on the first bosses between the timer and bosses and suitable guiding and locating ribs are provided as part of the single molding whereby the timer is dropped into the access opening to wedge at the first bosses and is then secured to the second bosses by suitable brackets so that the parts may be a single integral molding with the timer easily mounted where there is substantially only axial access to the housing opening.

6 Claims, 4 Drawing Figures

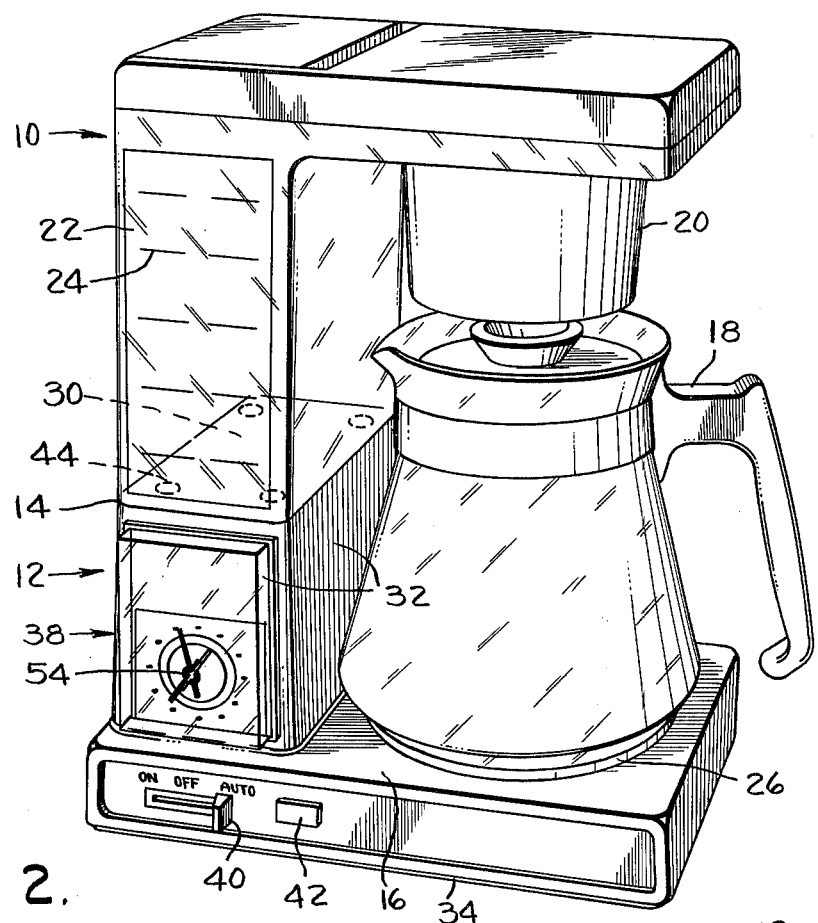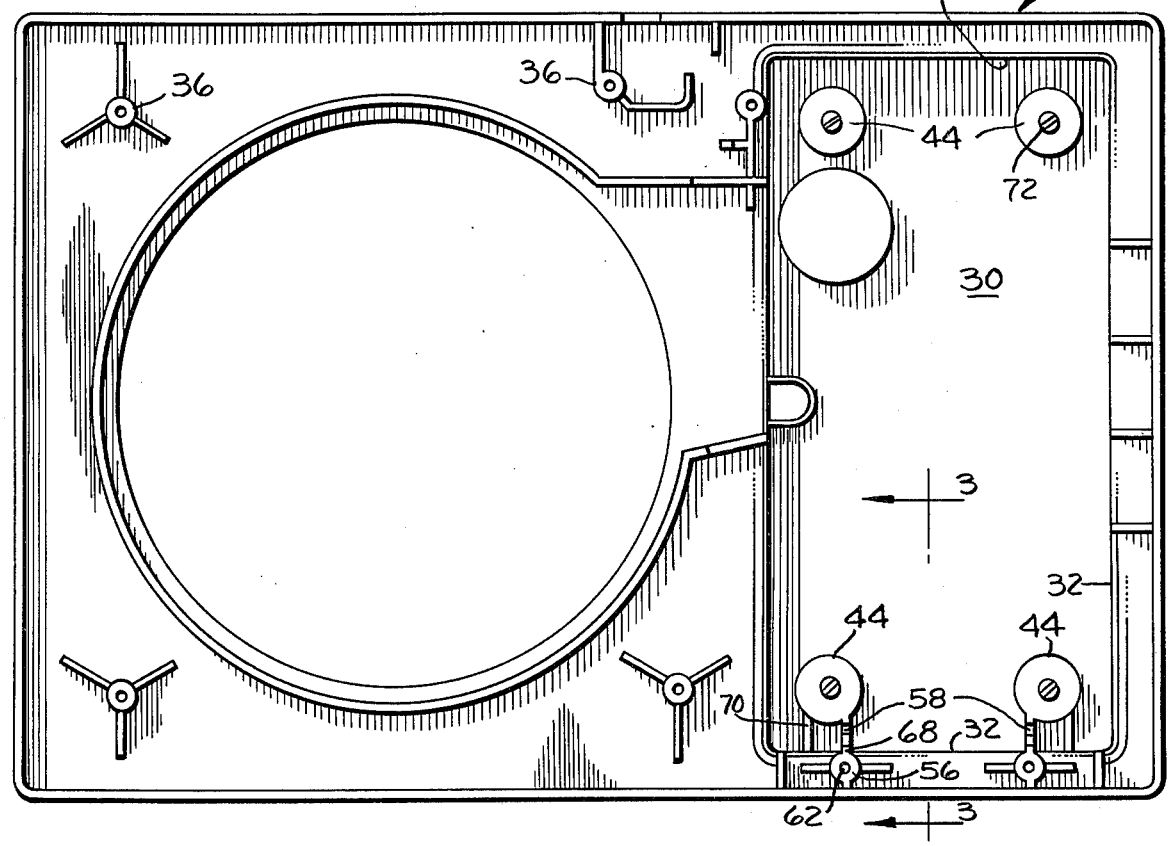

BREWER WITH TIMER MOUNT

BACKGROUND OF THE INVENTION

1. Field of the Invention

The invention relates to an electric coffeemaker and, more particularly, to an improved timer mount for easy assembly where the coffeemaker is formed of a single molded plastic box-shaped housing with an access opening only at one end.

2. Description of the Prior Art

Drip brewing apparatus for coffee and like beverages is well known. In electric drip coffeemakers, it is usual to provide a molded plastic housing, such as polypropylene with a general C-shape having a lower horizontal base for holding a receptacle such as a glass carafe, a generally vertical wall integrally molded with the base, and a forwardly extending overhanging top wall located above the carafe for holding a coffee brew basket. The basket is filled with dry ground coffee and then positioned on the underside of the top wall of the housing. A water reservoir is supplied generally in the vertical wall and an electric heater in the plastic base delivers heated water through an opening in the top wall of the housing and into the coffee brew basket. The heated water flows through the grounds and brewed coffee drips into the carafe receptacle. The base mounted heater performs a dual function in supplying the pumping action to move the water through its cycle as well as keeping the brewed coffee hot. Generally the parts are made of molded plastic as much as feasible and as molding techniques and aesthetics permit. It usually requires the top and bottom of the C-shape to be two separate moldings suitably joined along a parting line. While the use of timers to automatically start and stop various appliances is well known, such timers have not been applied to the new drip coffeemakers to Applicant's knowledge. This invention is concerned with the means of mounting a timer with only two parts and limited access to the plastic molding forming the vertical portion of the general C-shape housing.

SUMMARY OF THE INVENTION

Briefly described, the invention is directed to an electric brewing apparatus for coffee and like beverages that have a heated base supporting a receptacle and a coffee basket therebetween and having the usual means to store, heat, and deliver water to the basket. To this known combination, the invention provides an improvement wherein the base is part of a single molded plastic box-shaped housing having an access opening only at one end with the other closed end and side walls being integrally formed as a single molding. A first set of bosses on the closed end is spaced from a side wall and a standard timer, having spaced mounting means to secure on a flat inner side wall, is provided. A second boss means on a side wall is disposed adjacent the open end and all the bosses are directed toward and molded from the open access end. A wedging means is provided, preferably formed on the first set of bosses, whereby the timer is dropped into the access opening to wedge at one end on the first bosses and then is secured to the second boss means by an L-bracket for flat mounting on the wall surface with substantially only axial access to the opening for mounting the timer. Also, locating ribs and guiding ribs may be provided as part of the housing molding to space the timer and to center it into its wedged position with no separate parts being required. Thus, the main object is to provide a coffeemaker having a timer therein where the timer is wedged into position on a side wall in a blind fastening in a manner that requires no extra parts with substantially all the fastening mechanism being part of the integral molded housing and the timer securing means being accessible only axially from the open end.

BRIEF DESCRIPTION OF THE DRAWING

FIG. 1 is a perspective view showing the general coffeemaker with the timer in position.

FIG. 2 is a bottom view of the base of the coffeemaker with the bottom cover removed.

DESCRIPTION OF THE PREFERRED EMBODIMENT

Figure 3:
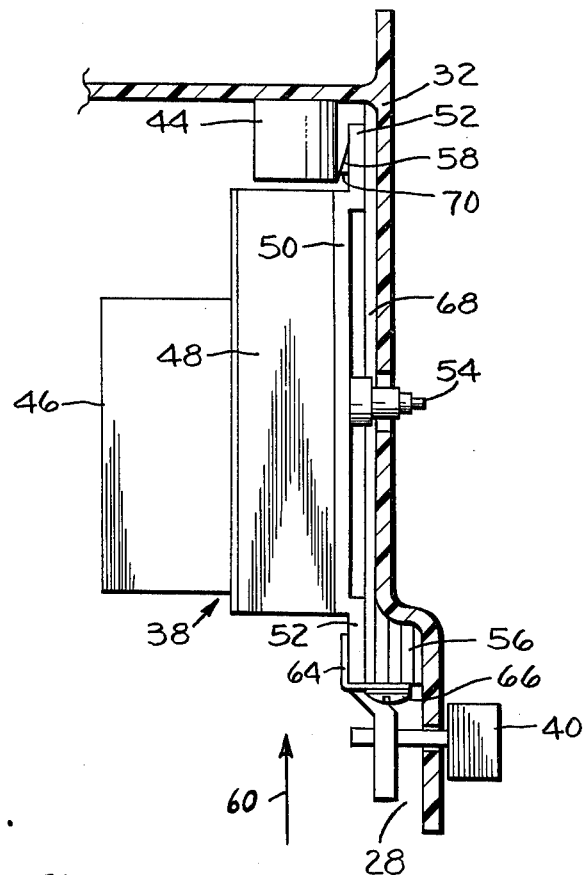
FIG. 3 is a partial section on line 3—3 of FIG. 2.

The invention will be described in connection with an electric drip coffeemaker although, it is usable for other drip beverages as will be apparent.

Referring to FIG. 1, there is shown an electric drip coffeemaker of the general C-shape form comprising upper plastic housing 10 and lower plastic housing 12 secured along parting line 14 by suitable means as will be explained. Each housing is an individual single mold of plastic material such as polypropylene. The lower housing includes an integral base 16 supporting a receptacle or carafe 18 and a coffee basket 20 is supported by the upper housing between the base and housing as generally known. To store water, reservoir 22 with visible measuring indicia 24 is provided and heating means 26 is disposed in the base to pump and deliver water to basket 20 as well as maintain the heat to the dispensed coffee in receptacle 18 all as well-known in the art.

For cost, economy, and appearance, the entire lower housing 12 is formed as a single integral molded part of a suitable plastic such as polypropylene which comprises a box-shaped housing as shown at 12 with only a single access opening 28 to the box from below as seen in FIG. 2. In other words, housing 12 is a closed box with only the lower flap missing. Thus, the access opening is only at one end 28 and the other end 30 and side walls 32 are all integrally formed. A suitable separate bottom cover 34 may be attached to close the interior of the housing by any suitable means such as screwing into molded webbed extensions 36 forming part of the box-shaped housing 12.

In accordance with the invention, it is desired to mount a standard timer, generally indicated at 38, on the front wall of the lower housing so that the coffeemaker may be set by suitable three position timer knob 40 with a signal light 42 indicating when the coffee is heating.

Figure 4:
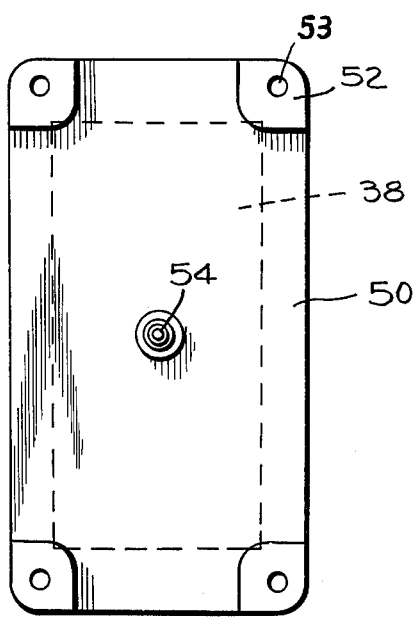
FIG. 4 is a plan view of a typical standard timer as used herein.

In order to mount the timer with as few parts as possible and use the full extent of molding techniques in the single molded lower housing 12, there is provided a first set of bosses 44—four as shown in FIG. 2—on the other or closed end 30 and these are spaced from the side walls 32 as shown. Generally, the timers are quite standardized in many appliances such as wakeup radios. Such timers, shown in FIGS. 3 and 4, employ a motor 46 with various gearing 48 all mounted on a plastic front plate 50 and usually having plural spaced ears 52 drilled at 53 for mounting screws as shown in FIG. 4. Short stub shafts 54 may extend through the side wall of the particular appliance for the clock and provide for adjustment of the timer. Such timers and their electrical connections are standard and are available by the thousands for many applications and generally require access to mount them on a flat wall with a screwdriver or the like through drilled holes 53. In the present application, access through single opening 28 is not available to mount the timer in this manner and a pair of bosses 44 are used instead as will be explained. To secure the timer after it has been mounted, a second boss means 56 is provided on the side wall disposed adjacent to the open end 28 as seen in FIGS. 2 and 3. It will be seen that all bosses 36, 44, and 56 are directed towards the open end and are thus easily molded from that end. In other words, these bosses can all be formed directly in the housing and the mold withdrawn from the open end of housing 12 to leave the fastening structure as an integral part of a single mold. However, the timer 38 normally requires access either from the front or the rear to secure it in position. The invention proposes to secure it in position by access substantially only axially through opening 28 at the one end of the molding. To this end, a wedging means 58 may be formed directly on the first bosses 44. This permits the timer 38 to be dropped into opening 28 in the direction of arrow 60 as seen in FIG. 3 to guide a pair of spaced ears 52 directly into wedge 58 on a pair of bosses and secure the blind end of the timer. It is possible to tip the timer slightly to wedge it into position and thus permit shaft 54 to extend through an opening in the front wall of housing 12. The timer is then secured in position as by using thread-forming screws for axially threading the second bosses at 62 and using an L-bracket 64 to span the non-wedged ears 52 by securing the bracket in position with a suitable screw 66 accessible axially of the opening as seen in FIG. 3. Thus, the timer is dropped into the access opening 28 to wedge in the first bosses at its blind end whereupon the accessible end is fastened by two brackets 64 requiring only axial access to the opening 28.

For better locating and centering the timer for a flat mount, a pair of locating ribs 68 extend axially on the wall surface 32 between the two bosses 44 thus spacing the timer uniformly from side wall 32. While such ribs could be formed with the wedge 58, it is better to form the ribs opposite the wedge 58 so the wedge on the boss forces the timer against the locating ribs for proper spacing. A second guiding rib 70 is provided between each of the first bosses 44 and the side wall 32 and spaced from the locating rib 68 with the guiding ribs being slightly longer so that they center the timer into the wedge as it is slid axially into position.

Thus, it will be apparent that I have provided a means for mounting a standard timer by using substantially only molded projections integral with lower housing 12 and requiring only two brackets and screws 64 and 66 to completely and tightly secure the timer in position. All of the ribs, locating 68 and guiding 70, all of the bosses 36, 44, and 56, and wedge 58 can be molded in a single integral housing 12 with the mold being withdrawn axially through opening 28 at the bottom of the housing. The top housing 10 may be secured by suitable screws 72 whereupon bosses 44 also provide a concealed fastening means for upper housing 10. This timer mounting structure permits a standard timer to be mounted axially only through the opening, uses only four parts—two screws and two brackets—and permits the entire base to be made aesthetically pleasing while securely mounting the timer with very few parts.

While I have hereinbefore shown a preferred form of the invention, obvious equivalent variations are possible in light of the above teachings. It is therefore to be understood that, within the scope of the appended claims, the invention may be practiced otherwise than as specifically described, and the claims are intended to cover such equivalent variations.

I claim:

1. An electric brewing apparatus for coffee and like beverages including a heated base supporting a receptacle and coffee basket therebetween, means to store, heat, and deliver water to said basket, the improvement wherein said base comprises, a single molded plastic box-shaped housing with an access opening only at one end and the other end and side walls being integrally formed, a first set of bosses on said other end spaced from a side wall, a standard timer having spaced mounting means for securing on a flat inner side wall for adjustment, second boss means on said side wall disposed adjacent said one end, all said bosses directed towards and molded from said one end, and wedging means between the timer and first bosses whereby the timer is dropped into the access opening to wedge at the first bosses and is then secured to the second boss means for flat mounting on the wall surface with substantially only axial access to said opening.

2. Apparatus as described in claim 1 wherein the wedge means is formed on the first set of bosses.

3. Apparatus as described in claim 2 wherein the timer spaced mounting means comprises plural spaced ears with a pair of ears wedging into a pair of said first bosses.

4. Apparatus as described in claim 3 wherein the second boss means is axially threaded and an L-bracket is attached thereto to span and secure the timer ears adjacent the one end.

5. Apparatus as described in claim 4 wherein a pair of locating ribs extend axially on the wall surface between the first and second bosses to space the timer uniformly from the wall, said ribs being formed opposite said wedge means.

6. Apparatus as described in claim 5 having a second guiding rib between each of said first bosses and side wall and spaced from the locating ribs to center the timer into wedged position at the first bosses.

* * * * *